(12) United States Patent
Hiremath et al.

(10) Patent No.: US 11,289,127 B1
(45) Date of Patent: Mar. 29, 2022

(54) INSTANT VIDEO EDITING AND ASSOCIATED METHODS AND SYSTEMS

(71) Applicant: Loom, Inc., San Francisco, CA (US)

(72) Inventors: Vinay Hiremath, San Francisco, CA (US); Bruno Henrique da Silva, Sao Paulo (BR)

(73) Assignee: Loom, Inc., San Francisco, VA (US)

( * ) Notice: Subject to any disclaimer, the term of this patent is extended or adjusted under 35 U.S.C. 154(b) by 0 days.

(21) Appl. No.: 17/525,876

(22) Filed: Nov. 13, 2021

Related U.S. Application Data

(60) Provisional application No. 63/148,400, filed on Feb. 11, 2021.

(51) Int. Cl.
  *G11B 27/031* (2006.01)
  *G11B 27/34* (2006.01)

(52) U.S. Cl.
  CPC ............ *G11B 27/031* (2013.01); *G11B 27/34* (2013.01)

(58) Field of Classification Search
  CPC .............................. G11B 27/031; G11B 27/34
  See application file for complete search history.

(56) References Cited

U.S. PATENT DOCUMENTS

| | | | |
|---|---|---|---|
| 6,285,361 B1 | 9/2001 | Brewer et al. | |
| 7,623,755 B2 | 11/2009 | Kuspa | |
| 7,669,130 B2 | 2/2010 | Agarwal et al. | |
| 7,756,391 B1 | 7/2010 | Trottier et al. | |
| 7,769,819 B2 * | 8/2010 | Lerman | G11B 27/34 709/217 |
| 8,515,241 B2 * | 8/2013 | Forsyth | G11B 27/034 386/239 |
| 8,527,879 B2 | 9/2013 | Symons et al. | |
| 9,936,229 B1 | 4/2018 | Wagenaar et al. | |
| 9,986,267 B2 | 5/2018 | Fang et al. | |
| 10,481,762 B2 | 11/2019 | Olofsson | |

(Continued)

FOREIGN PATENT DOCUMENTS

JP  2006339878 A  12/2006

OTHER PUBLICATIONS

Edward A. Fox, "Virtual Video Editing in Interactive Multimedia Applications", Communications of the ACM, vol. 32, No. 7, Jul. 1989, pp. 802-810.

(Continued)

*Primary Examiner* — Mishawn N. Hunter
(74) *Attorney, Agent, or Firm* — American Patent Agency PC; Daniar Hussain

(57) ABSTRACT

Systems and methods for instant video editing (e.g., trimming and stitching) are provided. In one embodiment, the trimming method includes receiving a video file. The video file includes a plurality of labeled video segments and a playlist. The playlist includes a plurality of segment labels, where each video segment includes a plurality of frames and a corresponding plurality of timestamps. The method receives a trim request including a target time range to be removed from the video file. The target time range starts at a beginning bookend timestamp and ends at an ending bookend timestamp. The method identifies a beginning bookend segment and an ending bookend segment. Finally, the method executes the trim request by processing one of the beginning bookend segment and the ending bookend segment. Also disclosed is a stitching method for stitching together two or more video files, which method may be utilized after each video file is trimmed.

20 Claims, 12 Drawing Sheets

(56) References Cited

U.S. PATENT DOCUMENTS

| | | | |
|---|---|---|---|
| 2003/0002851 A1 | 1/2003 | Hsiao et al. | |
| 2005/0053356 A1 | 3/2005 | Mate et al. | |
| 2008/0124050 A1* | 5/2008 | Deschamp | G11B 27/034 712/31 |
| 2008/0141135 A1* | 6/2008 | Mason | G11B 27/034 707/999.1 |
| 2010/0235857 A1 | 9/2010 | Lestage et al. | |
| 2011/0191684 A1* | 8/2011 | Greenberg | G06F 3/01 715/719 |
| 2016/0080470 A1 | 3/2016 | Shanson | |
| 2016/0358629 A1 | 12/2016 | Pribula | |
| 2017/0195750 A1 | 7/2017 | Kalish | |
| 2018/0254067 A1 | 9/2018 | Elder | |
| 2021/0006782 A1* | 1/2021 | Ramchandran | H04N 19/172 |

OTHER PUBLICATIONS

Filmora9 Video Editor, "Give Your Own Videos with New Touch", Accessed Oct. 2021. Available at https://www.iskysoft.com/filmora-video-editor-windows.html.

Free Video Cutter, "Trim Your Video Online Instantly", FlexClip, Accessed Oct. 2021. Available at: https://www.flexclip.com/features/trim-video.html.

Joyoshare Store Center, "2019 Top 10 Best Free Video Cutter Software to Trim Videos", Accessed Oct. 2021. Available at https://www.joyoshare.com/reviews/best-video-cutter-software.html.

M. Davis, "Editing out video editing", IEEE MultiMedia, vol. 10, Issue 2, Apr. 22, 2003, pp. 1-3.

MacKeeper with built-in Adware Cleaner, "Download Real Time Editing—Best Software & Apps", Accessed Oct. 2021. Available at: https://en.softonic.com/downloads/real-time-editing.

Kapwing, "Video Trimmer Trim and cut video to the perfect length with Kapwing", Accessed Oct. 2021. Available at: https://www.kapwing.com/trim-video.

Digital Broadcasting.com, "Real-time Digital Video Editing System", Accessed Oct. 2021. Available at: https://www.digitalbroadcasting.com/doc/real-time-digital-video-editing-system-0001.

SolveigMultimedia, "How to Edit Fragmented MP4 HLS Streams (M3U8) With the Video Editing SDK", Accessed Oct. 2021. Available at: https://www.solveigmm.com/en/howto/how-to-edit-fragmented-mp4-hls-streams-m3u8-with-the-video-editing-sdk/.

* cited by examiner

INSTANT VIDEO EDITING AND ASSOCIATED METHODS AND SYSTEMS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

This application is also related to U.S. Pat. No. 10,484,737, issued on 11 Nov. 2019, and entitled "Methods and Systems for Instantaneous Asynchronous Media Sharing," and to U.S. Pat. No. 9,641,566, issued on 2 May 2017, also entitled "Methods and Systems for Instantaneous Asynchronous Media Sharing." The entire disclosures of all referenced patents are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the invention are in the field of digital video editing. More specifically, embodiments relate to quickly (e.g., "instantly") editing video files.

BACKGROUND OF THE INVENTION

The statements in the background of the invention are provided to assist with understanding the invention and its applications and uses, and may not constitute prior art.

Recording a video on a personal device is a common experience for billions worldwide. However, editing a video remains a cumbersome task, especially when carried out through online platforms. When a user starts recording a video, they often have to cancel or redo their recording in order to edit and improve it. If the creator of a video makes a mistake mid-recording and wants to edit their video, they should feel a sense of excitement to edit the content. The current user experience in video editing is clunky, unintuitive, and pales in comparison to the recording experience. A user that has made a mistake recording a video often feels a wave of anxiety thinking about having to forage into the current video editing experience. Often times, they just re-record.

It would be an advancement in the state of the art to make the experience of editing a video seamless, instant, and hence enjoyable and exciting for the user. The most meaningful element to accomplish this goal is to make the experience of editing instant. In this disclosure, the word "edit" is used to denote either trimming a video file (i.e., cutting out part of the video file), or stitching one or more video segments together to form a video file, or a combination of trimming and stitching operations. The terms "trimming" and "cutting" are used interchangeably herein.

Specifically, it would be an advancement in the state of the art to establish instant editing, an editing process with as short a delay as possible, and having orders of magnitude in speed improvement over the conventional editing process.

U.S. Pat. Nos. 10,484,737 and 9,641,566 by LOOM replaced the inefficient workflow of recording a video locally and uploading it to an online platform (such as YOUTUBE) with a process that creates a complete video file ready for instant viewing, thus delivering an instant recording workflow. It would be an advancement in the state of the art to deliver an instant editing workflow as a companion to the instant recording workflow described in those prior patents. This would fundamentally change the manner in which video creators typically interact with video as a media format. In other words, it would be an advancement in the state of the art to replace the experience of opening up a video editor (such as FINAL CUT PRO), editing a video file, waiting upwards of hours for it to "render," and then uploading it to an online platform, with an instant video file editing experience.

It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

The following is an overview of the general mechanism for one embodiment of instant video editing disclosed herein. In this embodiment, the edited video file is served across a network by a server.

A video recording is usually generated following a playlist format (e.g., HLS/DASH). This means there is a video segment (or a group of pictures (GOP) segment) that gets created for each consecutive recording period. For example, there may be a 5-second segment that gets created for every 5 seconds of recording (e.g., each generated as a .ts file). The associated playlist is referenced in a primary playlist file (e.g., a .m3u8 file). In order to increase the performance of the instant editing mechanism, there may be multiple GOPs in a single video segment file. However, for simplicity of the descriptions below, it is assumed that a single GOP exists for each segment file.

Editing the video requires knowledge of the time ranges needed to be trimmed from the playlist, where each time range to be removed is defined by a first bookend and a second bookend delimiting its beginning and ending time stamps. The terms "first bookend", "beginning bookend", "first bookend timestamp", and "beginning bookend timestamp" are used interchangeably herein. Similarly, the terms "second bookend", "ending bookend", "second bookend timestamp", and "ending bookend timestamp" are used interchangeably herein. In one embodiment, the server receives the time ranges to be trimmed, and a new playlist is created. This new playlist contains a mix of three types of segments: (1) new segments that have been modified (i.e., part of their length had been trimmed), (2) segments that have not been modified but whose timestamps must be shifted (because content was removed from before in the video), and (3) segments whose content and timestamps have not been modified at all. In this disclosure, these types of segments are respectively termed "modified", "time-shifted", and "unmodified" segments. Modified segments are also termed "bookend segments".

In this embodiment, the first group of segments (modified/bookend segments) fall under two categories: Beginning bookend segments are cutoff modified/bookend segments containing only one beginning bookend, hence only a trailing portion of the segment needs to be removed. An Intra-coded picture, or Intraframe (I-Frame), may not need to be generated in the creation of beginning bookend segment. Ending bookend segments are regenerated modified/bookend segments with at least one second/ending bookend. Ending bookend segments require at least one I-Frame to be regenerated. In general, ending bookend segments require decoding the original segment, removing frames representing the part of the time range to be deleted, and re-encoding the remaining frames. Some examples illustrating the editing process and the different segment types are described further in the context of FIGS. 2A, 2B, and 2C.

When serving modified segments, the request goes to an Audio/Video (AV) media server (also called "avmedia server" or "video server") which generates, on-demand, one or more new modified segments. The generation of a regenerated modified segment may involve only re-encoding (computationally heavy) from the beginning of the segment up through the ending bookend defining the new beginning of the segment. The rest of the file may then be copied (very fast). The generation of a beginning bookend segment may involve no re-encoding.

When serving time-shifted segments (i.e., unmodified segments whose timestamps must be shifted), the playlist may mark a discontinuity sequence which tells the player to shift these timestamps on the user device (i.e., client device). This operation is very light on energy and resources. Alternatively, if the user device's player is not capable of performing this task, the task of shifting the timestamp of each frame of the segment may be carried out on the avmedia server (also very lightweight).

When serving completely unmodified segments, the regular segments are served, and no additional computation is needed.

Combining all of these features, it is possible to take a process that could take up to an hour on average-length videos and make it practically instant. This process enables not only the instant removal of parts of a video file, but also the stitching of arbitrary videos together instantly, with no upfront computational or storage cost. The video editing process would therefore be approximately constant time, irrespective of the length of the source video files.

Various methods and algorithms for instant video editing are within the scope of the present invention. In one embodiment, a computer-implemented method for instant video editing is disclosed, the method executable by a processor. The method includes the steps of receiving a video file. The video file includes a plurality of labeled video segments and a playlist. The playlist includes a plurality of segment labels providing an order for playing the labeled video segments, where each labeled video segment includes a plurality of frames and a corresponding plurality of timestamps. The method includes receiving a trim request. The trim request includes a target time range to be removed from the video file, where the target time range starts at a beginning bookend timestamp and ends at an ending bookend timestamp. The method includes identifying a beginning bookend segment and an ending bookend segment from the plurality of labeled video segments based on the beginning bookend timestamp and the ending bookend timestamp.

Finally, the method includes executing the trim request by processing one of the beginning bookend segment and the ending bookend segment. The processing the beginning bookend segment includes removing each frame of the beginning bookend segment that is after the beginning bookend timestamp. The processing the ending bookend segment includes decoding the ending bookend segment, removing each frame of the ending bookend segment that is before the ending bookend timestamp, and re-encoding each frame of the ending bookend segment that is after the ending bookend timestamp.

In one embodiment, the ending bookend timestamp is at an end of one of the plurality of labeled video segments.

In another embodiment, the beginning bookend timestamp is at a beginning of one of the plurality of labeled video segments.

In one embodiment, executing the trim request includes transmitting one of the beginning bookend segment and the ending bookend segment to a device for playback.

In one embodiment, the computer-implemented method further includes identifying a time-shifted segment, and processing the time-shifted segment by shifting a plurality of timestamps corresponding to a plurality of frames of the time-shifted segment by the duration of the target time range.

In another embodiment, executing the trim request further includes generating a modified playlist by identifying a given labeled video segment to be deleted from the playlist, and removing a given segment label corresponding to the given labeled video segment to be deleted from the playlist.

In one embodiment, the given labeled video segment to be deleted starts after the beginning bookend timestamp and ends before the ending bookend timestamp.

In one embodiment, executing the trim request further includes storing the modified playlist on a server, and transmitting the modified playlist to a device for playback.

In one embodiment, the trim request is coded in a data interchange format.

In one embodiment, the trim request is a JavaScript Object Notation (JSON) file

In one embodiment, executing the trim request further includes storing the trim request in a video editing database.

In another embodiment, executing the trim request further includes storing the trim request at a client-side cache.

In one embodiment, the method further includes receiving a segment request before the processing of the one of the beginning bookend segment and the ending bookend segment; and processing, just-in-time, the one of the beginning bookend segment and the ending bookend segment, in response to the receiving of the segment request.

In one embodiment, the segment request includes a request for one of the plurality of labeled video segments of the video file.

In another embodiment, the segment request includes a request for one of the beginning bookend segment and the ending bookend segment.

In one embodiment, the trim request is received from a mobile device.

In another embodiment, a computer-implemented method for instant video editing is disclosed, the method executable by a processor. The method includes the steps of receiving a first video file. The first video file includes a first plurality of labeled video segments and a first playlist, the first playlist including a first plurality of segment labels providing an order for playing the first plurality of labeled video segments. The method also includes receiving a second video file. The second video file includes a second plurality of labeled video segments and a second playlist, the second playlist including a second plurality of segment labels providing an order for playing the second plurality of labeled video segments. Each given labeled video segment of the first plurality of labeled video segments and of the second plurality of labeled video segments includes a plurality of frames and a corresponding plurality of timestamps. The method includes receiving a stitch request, the stitch request including the first playlist and the second playlist. The method includes receiving a segment request, and executing the stitch request, just-in-time, in response to the receiving of the segment request. Executing the stitch request just-in-time includes generating a modified playlist by appending the second playlist to the end of the first playlist.

In one embodiment, the segment request includes a request for one of the first plurality of labeled video segments of the first video file.

In another embodiment, the segment request includes a request for one of the second plurality of labeled video segments of the second video file.

In one embodiment, executing the stitch request further includes time shifting each of the second plurality of labeled video segments.

In one embodiment, time shifting a given labeled video segment of the second plurality of labeled video segments includes shifting a plurality of timestamps corresponding to a plurality of frames of the given labeled video segment by a duration of the first video.

In one embodiment, generating the modified playlist further includes identifying a redundant segment label of the second playlist, and renaming the redundant segment label of the second playlist.

In one embodiment, the redundant segment label of the second playlist is identical to a segment label of the first playlist.

In another embodiment, executing the stitch request further includes storing the modified playlist on a server, and transmitting the modified playlist to a device for playback.

In one embodiment, the stitch request is coded in a data interchange format.

In one embodiment, the stitch request is a JavaScript Object Notation (JSON) file.

In one embodiment, executing the stitch request further includes storing the stitch request in a video editing database.

In another embodiment, executing the stitch request includes storing the stitch request at a client-side cache.

In one embodiment, the stitch request is received from a mobile device.

In yet another embodiment, a computer-implemented method for instant video editing is disclosed, the method executable by a processor. The method includes the steps of receiving a first video file. The first video file includes a first plurality of labeled video segments and a first playlist, the first playlist including a first plurality of segment labels providing an order for playing the first plurality of labeled video segments. The method includes receiving a second video file. The second video file includes a second plurality of labeled video segments and a second playlist, the second playlist including a second plurality of segment labels providing an order for playing the second plurality of labeled video segments. Each given labeled video segment of the first plurality of labeled video segments and of the second plurality of labeled video segments includes a plurality of frames and a corresponding plurality of timestamps. The method includes receiving a trim request on the first video file. The trim request includes a target time range to be removed from the first video file, where the target time range starts at a beginning bookend timestamp and ends at an ending bookend timestamp. The method includes identifying a beginning bookend segment and an ending bookend segment from the first plurality of labeled video segments, based on the beginning bookend timestamp and the ending bookend timestamp. The method includes executing the trim request on the first video file by processing one of the beginning bookend segment and the ending bookend segment. Processing the beginning bookend segment includes removing each frame of the beginning bookend segment that is after the beginning bookend timestamp. Processing the ending bookend segment includes decoding the ending bookend segment, removing each frame of the ending bookend segment that is before the ending bookend timestamp, and re-encoding each frame of the ending bookend segment that is after the ending bookend timestamp. The method also includes receiving a stitch request to stitch together the two trimmed video files. The stitch request includes the first playlist and the second playlist. The method includes executing the stitch request by generating a modified playlist by appending the second playlist to the end of the first playlist.

In yet another embodiment, a computer-implemented method for instant video editing is disclosed, the method executable by a processor. The method includes the steps of receiving a video file. The video file includes a plurality of labeled video segments and a playlist. The playlist includes a plurality of segment labels providing an order for playing the labeled video segments, where each labeled video segment includes a plurality of frames and a corresponding plurality of timestamps. The method includes receiving a trim request. The trim request includes a target time range to be removed from the video file, where the target time range starts at a beginning bookend timestamp and ends at an ending bookend timestamp. The method includes identifying a beginning bookend segment and an ending bookend segment from the plurality of labeled video segments based on the beginning bookend timestamp and the ending bookend timestamp. The method includes identifying one or more given labeled video segments to be deleted from the playlist. The method includes executing the trim request by processing one of the beginning bookend segment and the ending bookend segment based on the target time range to be removed. Processing the beginning bookend segment includes removing each frame of the beginning bookend segment that is after the beginning bookend timestamp to generate a modified beginning bookend segment. Processing the ending bookend segment includes decoding the ending bookend segment, removing each frame of the ending bookend segment that is before the ending bookend timestamp, and re-encoding one or more frames of the ending bookend segment that are after the ending bookend timestamp to generate a modified ending bookend segment. The method includes executing the trim request by further removing deleted segment labels from the playlist corresponding to the given labeled video segments to be deleted. Finally, the method includes executing the trim request by generating a modified playlist for an edited video file. The edited video file includes the modified playlist and one of the modified beginning bookend segment and the modified ending bookend segment.

In various embodiments, a computer program product is disclosed. The computer program may be used for instant video editing, and may include a computer-readable storage medium having program instructions, or program code, embodied therewith, the program instructions executable by a processor to cause the processor to perform the aforementioned steps.

In various embodiments, a system is described, including a memory that stores computer-executable components, and a hardware processor, operably coupled to the memory, and that executes the computer-executable components stored in the memory, wherein the computer-executable components may include components communicatively coupled with the processor that execute the aforementioned steps.

In another embodiment, the present invention is a non-transitory, computer-readable storage medium storing executable instructions, which when executed by a processor, cause the processor to perform a process for instant video editing, the instructions causing the processor to perform the aforementioned steps.

In another embodiment, the present invention is a system for video editing, the system comprising a user device having a 2D camera, a processor, a display, a first memory; a server comprising a second memory and a data repository; a telecommunications-link between said user device and said server; and a plurality of computer codes embodied on said first and second memory of said user-device and said server, said plurality of computer codes which when executed causes said server and said user-device to execute a process comprising the aforementioned steps.

In yet another embodiment, the present invention is a computerized server comprising at least one processor, memory, and a plurality of computer codes embodied on said memory, said plurality of computer codes which when executed causes said processor to execute a process comprising the aforementioned steps. Other aspects and embodiments of the present invention include the methods, processes, and algorithms comprising the steps described herein, and also include the processes and modes of operation of the systems and servers described herein.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the manufacturing method and devices described herein.

Embodiments of the present invention described herein are exemplary, and not restrictive. Embodiments will now be described, by way of examples, with reference to the accompanying drawings, in which.

DETAILED DESCRIPTION OF THE INVENTION

Figure 1:
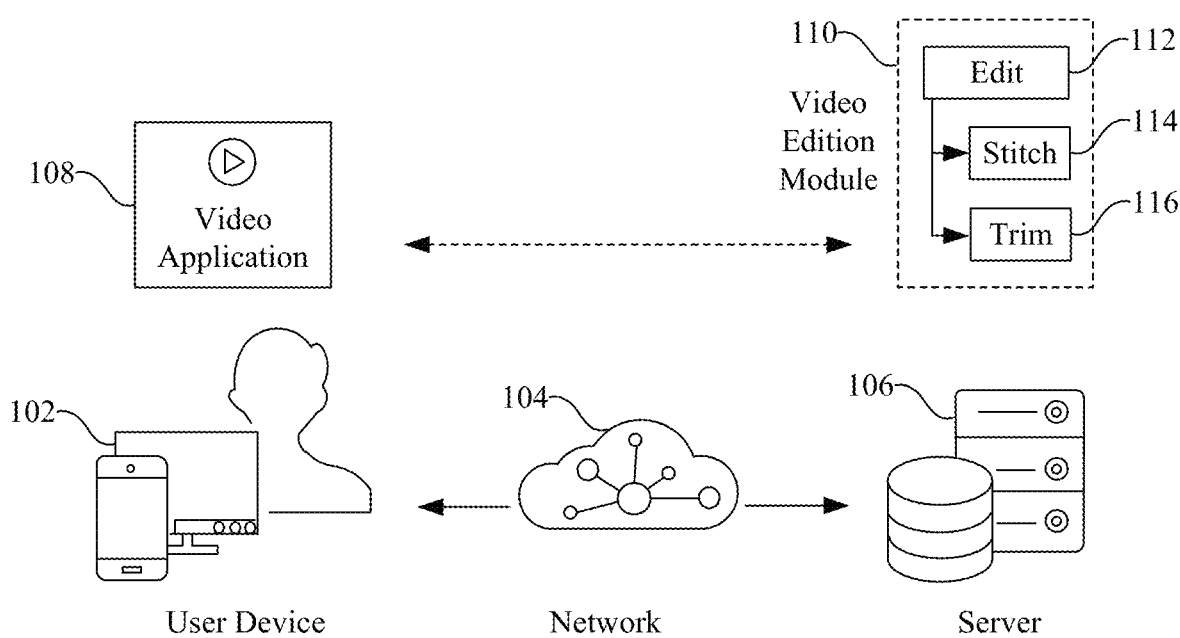
FIG. 1 shows an illustrative block diagram of the hardware and software modules involved in video editing, in accordance with an embodiment of the present invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

As used herein, the singular forms "a," "an," and "the" include plural references unless the context clearly indicates otherwise. Thus, for example, reference to "a fiber" includes a single fiber as well as a mixture of two or more different fibers, and the like. Also as used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. In certain embodiments, the term "about" includes the recited number +/−10%, such that "about 10" would include from 9 to 11.

LOOM is a trademark name carrying embodiments of the present invention, and hence, the aforementioned trademark names may be interchangeably used in the specification and drawing to refer to the products/manufacturing process offered by embodiments of the present invention. With reference to the figures, embodiments of the present invention are now described in detail.

Video Formats

A video recording is usually generated following a playlist format (e.g., HLS/DASH). This means that there is a video segment that gets created for each consecutive recording period. For example, there may be a 1-second segment that gets created for every 1 second of recording (the choice of segment duration being arbitrary). The associated playlist is referenced in a primary playlist file.

A playlist is also referred to as a manifest. The video manifest identifies the video stream and a list of video segments through associated URIs (Uniform Resource Identifiers, also referred to as Uniform Resource Locators, or URLs). The format of the video manifest depends on the video streaming protocol and usually includes other metadata associated with the file or stream, such as bitrate, title, description, closed captioning, or thumbnail information. Examples of video manifest formats include APPLE'S m3u8, ADOBE'S F4M, MICROSOFT'S ismc, and MPEG mpd. The words "playlist" and "manifest" are used interchangeably herein.

Each video segment is a collection of frames, having an audio and video stream. The container of a video file tells a video player running on a user's device how these frames are laid out in the file. In addition to supplying the audio and video frames to a player, the player needs to receive information about when to play a video and audio segment. These are known as timestamps. Typically, there is one timestamp associated with each frame.

Inside the video data of the video segment, there are three different types of frames: I, B, and P frames. The letters I, B, and P stand for Intra, Bidirectional predictive, and Predictive. An I-frame (Intra-coded picture, Intra-coded frame, or Intraframe) is a complete image (e.g., a JPG or BMP image file) that is coded without reference to another frame. However, P-frames (Predicted pictures), also called delta-frames, carry only differences in the frame relative to the previous frame, thus contributing to video compression. B frames (Bidirectional predicted picture) provide more compression by using differences with both the preceding and following frames. P and B frames are also called Inter-frames.

A primary method by which video compression works is by avoiding the storing of full images at each timestamp. Full images take up significant storage and resources. Sometimes, the changes from one frame to the next are quite small. Thus, instead, full images are stored every now and then, and predictive frames are stored everywhere else, indicating image changes since the last frame. This allows a video player to re-generate images in-between I-Frames. This comes at the cost of needing to download and parse information all the way back to the last I-Frame in order to seek and play back any random spot in a video segment.

For example, if a user decides to jump to 5 seconds into a video segment, and the last I-Frame was at the $3^{rd}$ second of the video segment, the player must download that full last image, at second 3, as well as all of the Inter frames (P- and B-frames) between the last I-Frame and second 5. The video player must then apply the mathematical transformations from all the B- and P-frames to the full frame at second 3 to get the true full image at second 5. The player can then display the image at second 5.

Playlist Videos

An advanced way of generating video files is to have recorders directly generate a playlist of video segments rather than a single video file. The playlist format comprises a playlist that serves as an entry point (e.g., a header) for the video file. The playlist points to a series of video segment files called "part" files. Part files, or segments, are played in series, leading to a similar uninterrupted playback output equivalent to playing a single video file.

There are several reasons generating playlists is advantageous. For instance, dealing with files is conceptually easier than dealing with bytes: an instruction to "ignore files A, B, and C" comes with significantly less complexity than an instruction not to download a set of byte ranges.

Importantly, the playlist video format is a major enabler of instant video editing since it greatly simplifies the computer code. However, it is not strictly necessary for the methods and systems disclosed herein to be applied. Indeed, the methods and systems disclosed herein are not limited to the playlist video format. Since the generation of byte ranges for various GOPs can be done fast, the methods and systems disclosed herein can be applied to single-video files, with the playlist replaced by the byte ranges generated for each GOP of the single-video file.

The playlist format enables the editing of a video file through the manipulation of its playlist and a dramatically reduced amount of video processing. For example, the removal, addition, or reshuffling of a discrete number of segments from, to, or within a playlist can be carried out by the mere editing of the playlist, provided all segments are available to the user device.

FIG. 1 shows an illustrative block diagram of the hardware and software modules involved in video editing, in accordance with an embodiment of the present invention. In FIG. 1, a user device 102 runs a video application 108 configured to play a video received from a server 106 across a network 104. The server 106 has a video edition module 110 configured to receive and execute video edit 112 requests, where a video edit request comprises at least one trim 114 or one stitch 116 request. Video edit requests 112 for a given video file emanate from the editor's user device, where the editor is a user with permission to edit the video (e.g., the owner or creator of the video).

Video trimming denotes the removal of at least one time range from a video file, as illustrated in FIGS. 2A, 2B, 2C, and FIGS. 4A, 4B, and 4C. Video stitching, on the other hand, denotes the merging of one or more external video segments to an existing video file by appending them to the end of its playlist and time-shifting their timestamps accordingly. Video stitching is illustrated in FIGS. 3A, 3B, 3C, and FIGS. 4A, 4B, and 4C.

In one example configuration, a video file is uploaded to a server 106 by its owner or creator (i.e., the editor) in order to be played back by video applications 108 on a plurality of user devices 102. Video playback may be configured as a simultaneous broadcast or multiple unicast streams (e.g., Video on Demand (VoD)). The editor may edit the video file while it is being played by the user-side video applications. Such real-time video editing is carried out by sending edit requests 112 to the video edition module 110 at the server 106. The editor of the video file may generate and send edit requests 112 (1) before uploading the video file to the server 106, (2) during the upload phase so that the editing happens as soon as the edit requests 112 are received by the server 106, (3) after the video upload phase and before video playback at one or more user devices 102, and (4) during video playback at one or more user devices 102, irrespective of whether the upload phase is complete. The edit operations described herein can therefore be carried out at any time before or during the playback process, at the video editor's device, on the server 106, or at the viewer's device 102. In one configuration of particular interest, an edit request 112 may be executed right before the playback of a modified segment at the first user device 102 requesting the edited segment, leading to the just-in-time (JIT) creation of one or more edited segments.

The methods and systems described herein make JIT segment editing possible, where the "JIT" qualifier describes the generation of a modified segment when its playback is imminent, including not only at an explicit request for the modified segment itself, but also at a request for (1) any segment from a playlist where the modified segment is listed, or (2) the first modified segment of the playlist. Other video editing configurations are within the scope of the current invention.

Trimming and Generating Bookend Segments

Figure 2A:
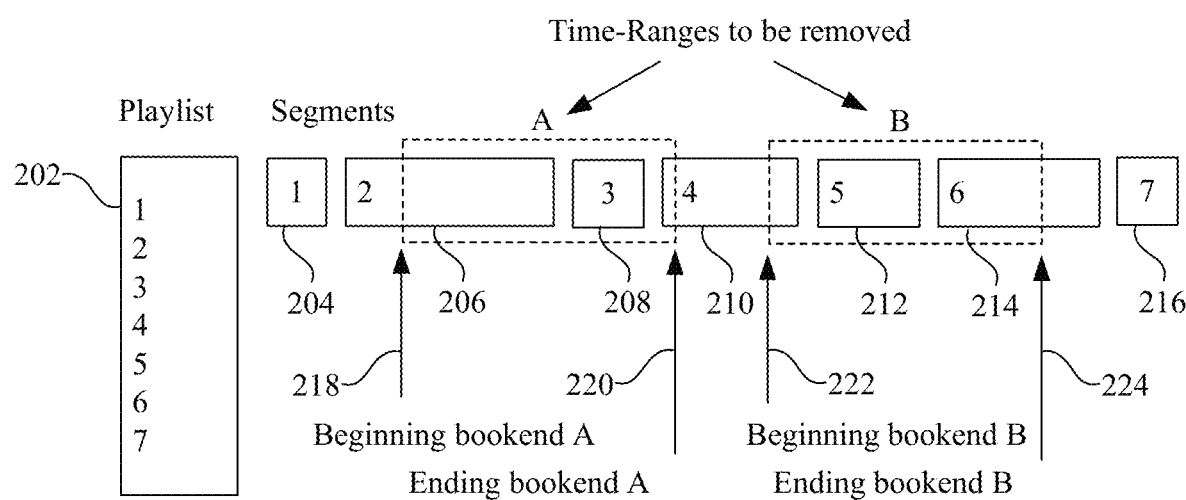
FIG. 2A shows a schematic diagram of one example of instant video editing where a trimming operation is requested, in accordance with embodiments of the present invention.
Figure 2B:
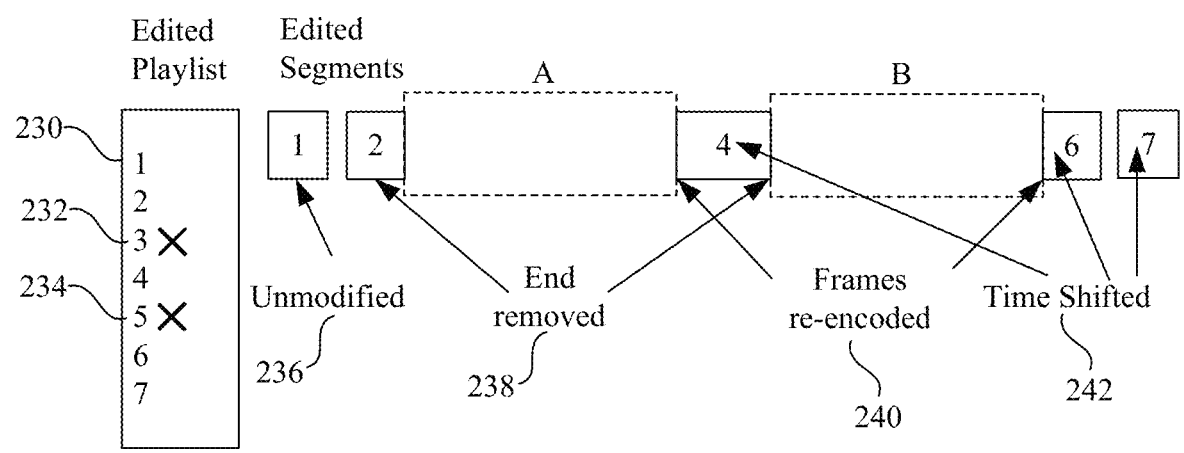
FIG. 2B shows the segment processing operations required by the trimming request of FIG. 2A, in accordance with an embodiment of the present invention.
Figure 2C:
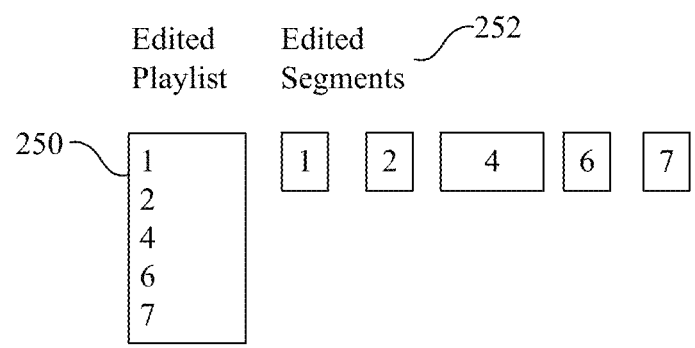
FIG. 2C shows the video resulting from executing the trimming request described in FIG. 2A, in accordance with an embodiment of the present invention.

The removal of one or more time ranges from a video file is called video trimming and is illustrated in the examples of FIGS. 2A, 2B, and 2C. FIG. 2A shows a schematic diagram of one example of instant video editing where a trimming operation is requested, in accordance with embodiments of the present invention. The illustrative video trimming operation 200 of FIGS. 2A, 2B, and 2C shows a video recording with two portions to be trimmed, leading to segments being unmodified, deleted, or edited as described below. Other trimming configurations are within the scope of the present invention.

The beginning and ending bookend of a time-range indicate the timestamps delimiting the time-range to be trimmed. FIG. 2A shows an original playlist 202 containing 7 numbered segments of various lengths (204-216), where the horizontal axis denotes time. A user wishes to trim the two time-ranges denoted A and B and illustrated in FIG. 2A by two areas delimited by dashed boxes. The first time-range to be removed (A) is defined by its beginning (218) and ending (220) bookend time stamps and includes the end of segment 2 (206), all of segment 3 (208), and the beginning segment 4 (210). The second time-range to be removed (B) is defined by its beginning (222) and ending (224) bookend timestamps and includes the end of segment 4 (210), all of segment 5 (212), and the beginning of segment 6 (214). The terms "bookend" and "bookend timestamp" are used interchangeably herein.

As described above, the removal of one or more time-ranges divides the segments of a playlist into three types of segments: (1) Bookend segments are segments that need to be modified (i.e., part of their length needs to be cut out). (2) Time-shifted segments are segments that need not be trimmed, but whose timestamps must be shifted because content was removed from before in the video. (3) Unmodified segments are segments having content and timestamps that need not be modified at all. Furthermore, bookend segments are either segments containing only one first bookend (i.e., beginning bookend segments, or cutoff bookend segments), with only a trailing portion of the segment needing to be removed and no I-Frame needing to be regenerated, or regenerated bookend segments, having at least one ending bookend, hence requiring at least one I-Frame to be regenerated. Note that beginning and ending bookend segments may require decoding to access their uncompressed frames, ahead of the frame removal step, as discussed below.

In the example of FIGS. 2A, 2B, and 2C, it is assumed that each segment comprises only one I-Frame at the beginning. Therefore, segment 1 (204) is an unmodified segment, segments 2 (206), 4 (210), and 6 (214) are bookend segments, and segment 7 (216) is a time-shifted segment. Segments 3 (208) and 5 (212) can be ignored since they are to be removed (i.e., deleted from the final playlist). The bookend segments in the example of FIGS. 2A, 2B, and 2C include one beginning bookend segment (segment 2 (206)) and two ending bookend segments (segments 4 (210) and 6 (214)), where segment 4 (210) has two bookends: ending bookend A (220) and beginning bookend B (222)

FIG. 2B illustrates the various segment edition operations that are required to edit the video. Apart from a single unmodified segment 236, the three segment edition operations required for this trimming operation are: (1) segment end removal 238 for segments 2 and 4, (2) frame re-encoding 240 (e.g., new I-Frame computation) starting at the location of ending bookend A (220) for segment 4 and ending bookend B (224) for segment 6, and (3) time shifting 242 for segment 7 as well as the remaining parts of segments 4 and 6. In addition, the original playlist (202) is to be edited 230 by deleting removed segments 3 (208) and 5 (212). Note that the steps of segment end removal and frame re-encoding may require segment decoding as a prerequisite.

In an embodiment where the player software in the user device needs to download the required segments in real-time (see JIT discussion of FIG. 1), steps to generate the bookend segments and the new playlist may include, for Time-Range A:

1. Downloading segments 1 and 2.
2. Trimming the end of segment 2.
3. Ignoring segment 3 entirely.
4. Downloading all of segment 4 because the recordings only have a single I-Frame at the beginning of each playlist part.
5. Re-encoding the frames of the new bookend segment 4 (e.g., generating the beginning I-Frame).

For Time-Range B, further steps may include:

1. Trimming the end of segment 4.
2. Ignoring segment 5 entirely.
3. Downloading all of segment 6 because the recordings only have a single I-Frame at the beginning of each playlist part.
4. Re-encoding the frames of the new bookend segment 6 (e.g., generating the beginning I-Frame).
5. Downloading segment 7.
6. Shifting timestamps from the beginning of segment 4 onwards back the amount of time that was trimmed (i.e., the duration of time-range A for segment 4 and the total duration of time-ranges A and B for segments 6 and 7). This includes shifting back timestamps from segment 7, although the contents of segment 7 are not altered at all).

In addition, as noted above, the original playlist 202 is to be edited by deleting removed segments 3 and 5. In addition, depending on video encoding, the various steps of segment end removal and frame re-encoding may require segment decoding as a prerequisite.

FIG. 2C shows the resulting edited playlist 250 along with the new edited segments 252.

It is important to note that only relevant segments are downloaded (e.g., deleted segments are not downloaded), hence reducing transmissions and saving bandwidth and energy.

Furthermore, segments from another video or newly recorded segments may be appended to the end of a video by adding them in the desired order to the end of the playlist and time-shifting their timestamps accordingly, as was done for segment 7 in FIGS. 2B and 2C.

In addition, the removal of the tail end of a video segment is a special case of trimming where the time range to be removed extends from a beginning bookend to the end of the video segment. Such a trim request may either be represented without an ending bookend, or using an explicit ending bookend pointing to the end of the video segment. Hence, the absence of an explicit ending bookend may be considered to represent an implicit ending bookend located at the end of the video segment. In another embodiment, the absence of an explicit ending bookend may be considered to represent an implicit ending bookend located at the end of the video file.

Note that a beginning bookend timestamp may occur at the beginning of a segment. In this case, processing the beginning bookend segment may mean deleting it entirely from the video. Similarly, an ending bookend timestamp may occur at the end of a segment. In this case, processing the ending bookend segment may mean deleting it also. Finally, the beginning and ending bookend timestamp of a trim request may occur within the same segment. In this case, processing the segment requires decoding all the segment frames, applying the trim (i.e., removing the frames between the beginning and ending bookends), and re-encoding the segment based on the remaining frames.

Generally, processing an ending bookend segment requires decoding, removing one or more frames, and re-encoding the remaining frames so as to avoid any dependence on the removed frames. In one embodiment, processing a beginning or ending bookend segment requires decoding the segment to obtain the uncompressed segment frames, removing one or more frames, and re-encoding the entire segment, where re-encoding requires the generation of at least one I-frame. Furthermore, processing time shifted segments may also require re-encoding.

Stitching Segments and Videos

Figure 3A:
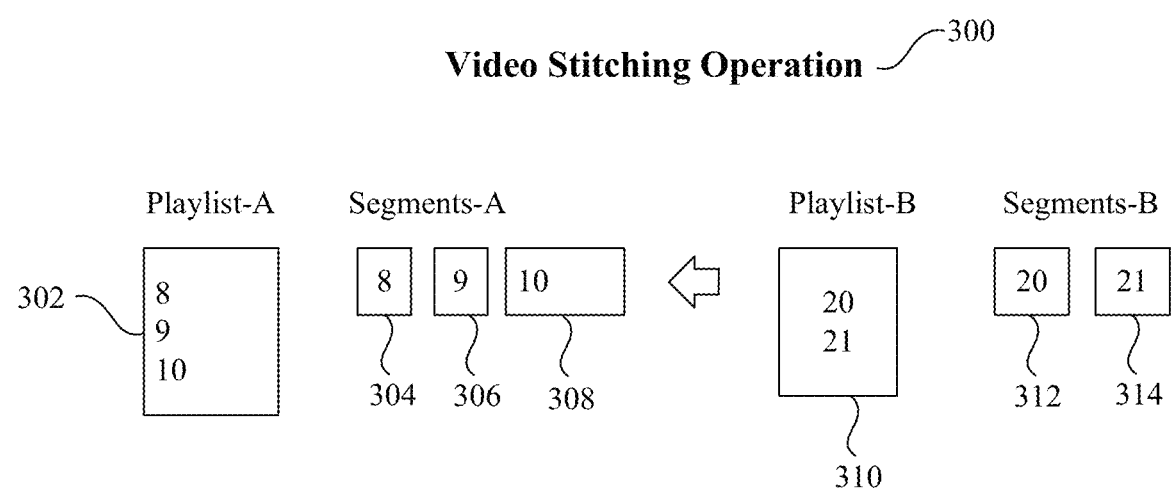
FIG. 3A shows a schematic diagram of one example of instant video editing where a stitching operation is requested, in accordance with embodiments of the present invention.
Figure 3B:
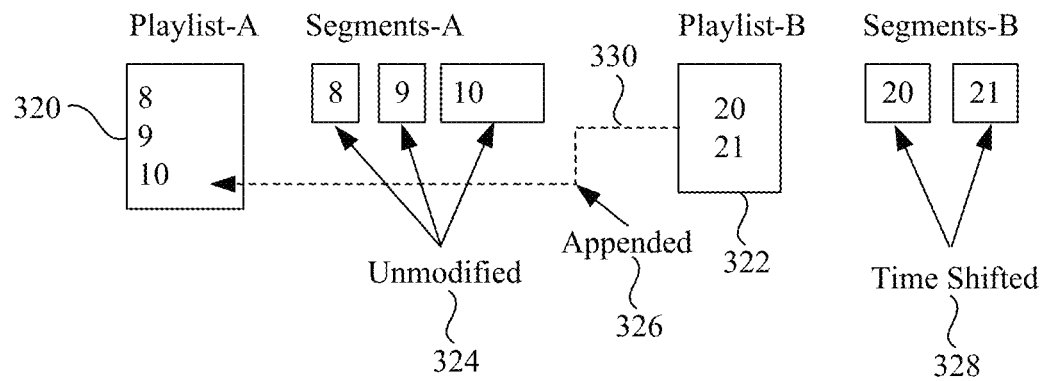
FIG. 3B shows the segment processing operations required by the stitching request of FIG. 3A, in accordance with an embodiment of the present invention.
Figure 3C:
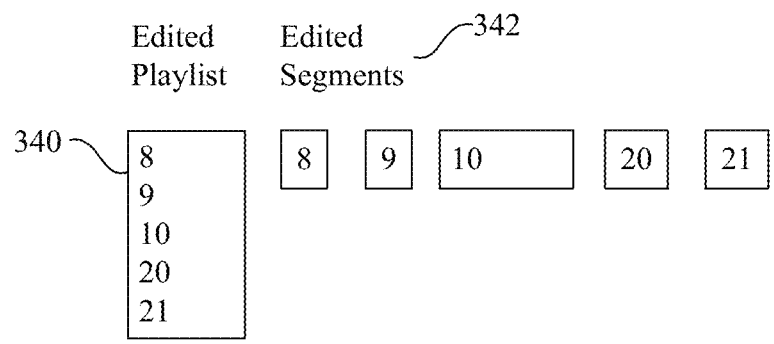
FIG. 3C shows the video resulting from executing the stitching request described in FIG. 3A, in accordance with an embodiment of the present invention.

The merging of one or more external video segments with an existing video file by appending them to the end of its playlist and time-shifting their timestamps accordingly is called video stitching and is illustrated in FIGS. 3A, 3B, and 3C.

The illustrative video stitching operation 300 of FIGS. 3A, 3B, and 3C show two video files to be stitched, leading to segments being unmodified or edited as described below. Other stitching configurations are within the scope of the present invention. FIG. 3A shows two playlists to be stitched, Playlist-A (302) and Playlist-B (310). Playlist-A consists of segments 8 (304), 9 (306), and 10 (308), collectively referred to as Segments-A. Playlist-B (310) consists of segments 20 (312) and 21 (314), collectively referred to as Segments-B. Segments-B are to be appended to the end of Segments-A.

FIG. 3B illustrates the operations involved in the overall stitching operation. While Segments-A remain unmodified (324), Segments-B are time-shifted (328) so that the starting timestamp of segment 20 is at the end of segment 10, and the starting timestamp of segment 21 is at the end of the time-shifted segment 20. The dashed arrow 330 in FIG. 3B shows that Segments-B are appended (326) to the end of Segments-A through the generation of an edited playlist. The edited playlist is formed by appending Playlist-B (322) to the end of Playlist-A (320). The terms "edited playlist" and "modified playlist" are used interchangeably herein.

FIG. 3C shows the resulting edited playlist 340 along with the new edited segments 342.

Figure 4A:
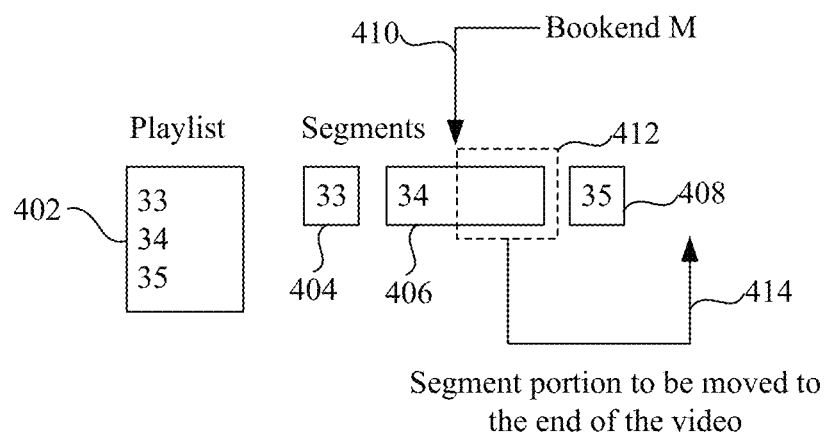
FIG. 4A shows a schematic diagram of one example of instant video editing where a combined trimming and stitching operation is requested, in accordance with embodiments of the present invention.
Figure 4B:
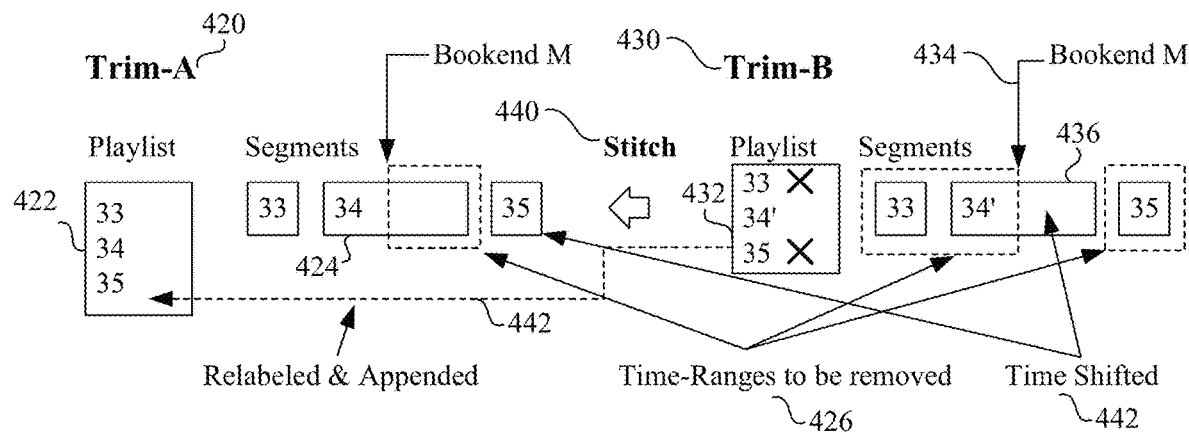
FIG. 4B shows the segment processing operations required by the combined trimming and stitching request of FIG. 4A, in accordance with an embodiment of the present invention.
Figure 4C:
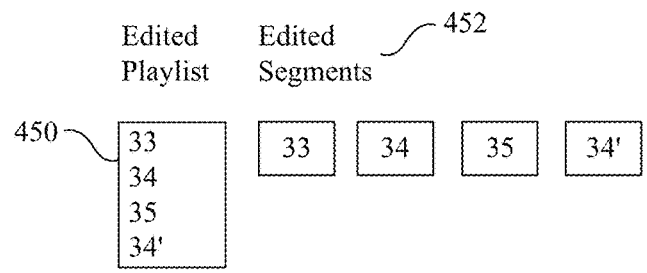
FIG. 4C shows the video resulting from executing the combined trimming and stitching request described in FIG. 4A, in accordance with an embodiment of the present invention.

Segment relabeling is the modification of one or more segment labels in one or more playlists to be stitched. Video stitching may require segment relabeling. Specifically, if two or more segments belonging to two playlists to be stitched share a common label, one of the two identical labels must be modified so as to become distinct from any of the labels of the two playlists. In the example of FIGS. 3A, 3B, and 3C, the two original playlists do not carry one or more identical segment labels. In other words, the segment labels in Playlist-A (320) are distinct from the segment labels in Playlist-B (322). Consequently, the two playlists may be appended without segment relabeling. FIGS. 4A, 4B, and 4C, below, show an example where segment relabeling is required.

A video editing operation comprises at least one trimming or one stitching operation. More complex editing operations may combine trimming and stitching on one or more videos. For example, moving a portion of a segment of a video to the end of that video may be viewed as two trimming operations on two copies of the video, followed by one stitching operation on the two trimmed copies of the video. Such a moving operation is illustrated in FIGS. 4A, 4B, and 4C.

FIG. 4A illustrates the desired moving operation, where a video file having segments 33 (404), 34 (406), and 35 (408) in its playlist 402 is shown, and where a portion 412 (i.e., a time range) of segment 34 (408) is to be moved 414 to the end of the video. The portion 412 of the video file to be moved starts from Bookend M 410, ends at the end of segment 34, and is denoted in FIG. 4A by the dotted rectangle 412.

FIG. 4B shows that the moving operation described in FIG. 4A can be decomposed into two trimming operations carried out on two distinct copies of the target video file (420 and 430), and one stitching operation (440) to combine the two copies. In the first trimming operation 420 (labeled Trim-A), the portion of segment 34 to be moved is deleted 426, the remaining frames forming a "first new segment 34" 424 containing the remaining portion of segment 34. Segment 35 is also time-shifted 442 to start after the remaining portion 424 of segment 34. The playlist copy 422 of Trim-A remains unmodified, with label 34 now denoting the "first new segment 34" 424 containing the remaining portion of segment 34.

In the second trimming operation 430 (labeled Trim-B), all portions of the video file that are distinct from the portion 412 of segment 34 to be moved are deleted 426. Hence, Trim-B 430 requires at least the generation of a new I-Frame at Bookend M 434 and the removal 426 of earlier portions of segment 34 (as well as the entirety of segments 33 and 35). The decoding of the entirety of segment 34 prior to the removal 426 of the frames before Bookend M 434 may be required. In addition, the re-encoding of the remaining frames after the removal 426 of the frames before Bookend M 434 may also be required. The execution of Trim-B 430 leads to the generation of a "second new segment 34" 436 corresponding to the portion of segment 34 to be moved 412. Trim-B 430 also requires the removal of labels 33 and 35 from its playlist copy 432, leaving its playlist copy 432 with a single label 34 denoting the "second new segment 34" 436.

A stitching operation (440) is now needed to append the two trimmed video file copies. As is required by the stitching operation, the "second new segment 34" 436 generated through Trim-B 430 is time-shifted 442 so as to start playing at the end of the video segments generated by Trim-A 420. Finally, the Trim-B playlist copy (432) is relabeled and appended 442 to the Trim-A playlist copy (422) to form the desired stitched video file.

The final relabeling and appending operation is indicated by a dashed arrow 442 on FIG. 4B. The "second new segment 34" 436 generated through Trim-B 430 is renamed segment 34' to differentiate it from the "first new segment 34" 424 generated through Trim-A 420. Segment 34' hence corresponds to the portion 412 of the original segment 34 to be moved to the end of the original unedited video in FIG. 4A. The playlist relabeling and edition steps 442 complete the stitching 440 operation.

FIG. 4C shows the resulting edited playlist 450 along with the new edited segments 452.

It is important to note that the video portion-moving operation shown in FIG. 4B may not require the creation of a second copy of the entire video. Rather, the required operations may be limited to (1) decoding segment 34 and reencoding all frames before Bookend-M, (2) Re-encoding all frames after Bookend-M (e.g., generating a new I-Frame at Bookend M), thus creating a new segment, (3) relabeling the new segment (e.g., 34'), and (4) adding the new segment label to the playlist. Consequently, moving segment portions as illustrated in FIGS. 4A, 4B, and 4C does not necessarily entail creating duplicates of entire video files for each editing operation.

Note also that shifting timestamps is cheap in energy and computational resources. Generating bookend segments is also relatively fast and cheap. The editing operation can be done instantly at playback time on the user device for almost all devices. To generate a new playlist file instantly and on-demand, all that is needed is to store some information with each of the videos about the segment portions that were edited out of a video or reordered within a video. This client-side focus is ideal since the computational power and video capabilities of client devices are increasing. These methods can be deployed across web, iOS, and Android platforms.

Furthermore, it should be noted that although the methods disclosed herein work on HLS/DASH (playlist video formats), they may be applied to either a contiguous or a single-container format (such as .mp4). This is because the fundamental unit that editing operations work across are GOPs. Since there are usually multiple GOPs in a single video file, as long as the GOPs are known, all the editing operations described herein can be applied on GOPs instead of files or segments. As mentioned above, since generating a list of GOPs for a given video file can be carried out fast, the methods and systems described herein are not limited to video files but extend to any delimited video subunits of any video file format, such as GOPs.

Instant Video Editing

Figure 5:
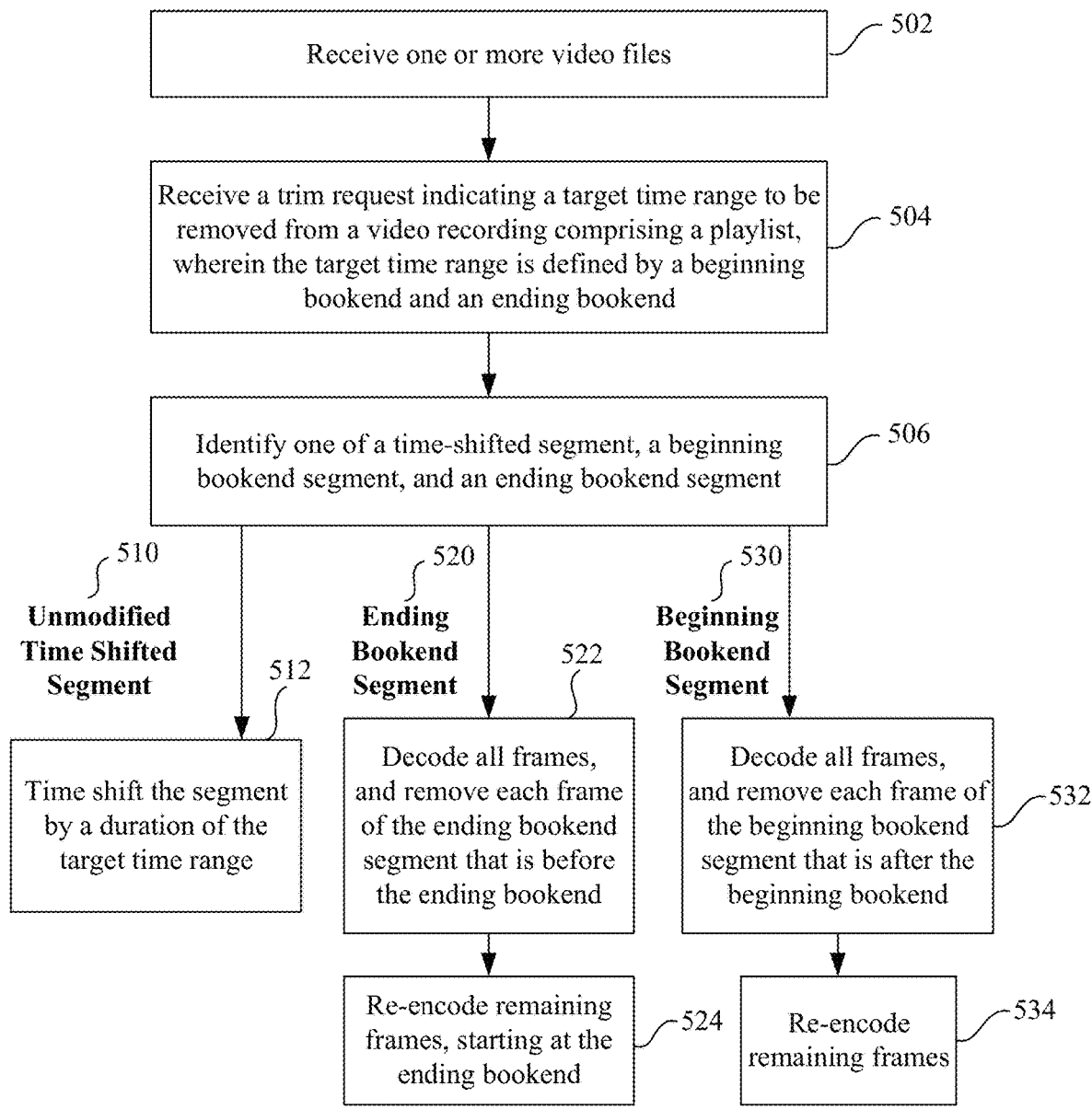
FIG. 5 shows a flowchart that details a process of instant video editing where a trimming request is executed, in accordance with one embodiment of the present invention.

FIG. 5 shows a flowchart that details a process of instant video editing where a trimming request is executed, in accordance with one embodiment of the present invention. At step 502, one or more video files are received by a system to carry out instant video editing. At step 504, a trim request is received by the system. The received trim request indicates a target time range to be removed from a video file comprising a playlist, where the target time range is defined by a beginning bookend and an ending bookend. At step 506, the system identifies, within the segments of the video recording to be trimmed, one of a time-shifted segment, a beginning bookend segment, and an ending bookend segment, as defined above.

If the identified segment is a time-shifted segment 510, the system processes it at step 512 by time shifting the segment's frames by a duration of the target time range. Note that the time-shifting operation may be carried out at a video server or at a user device (e.g., through instructions to a video player software). If the identified segment is an ending bookend segment 520, the system processes it at step 522 by decoding the ending bookend segment and removing each frame that is before the ending bookend. At step 524, the system further re-encodes the remaining frames of the ending bookend segment, starting at the ending bookend. This step may include the generation of a new I-Frame at the ending bookend. In practice, the new I-Frame may be computed while the removal of earlier frames is being carried out. Hence, steps 522 and 524 may be concurrent or overlap in time. If the identified segment is a beginning bookend segment 530, the system processes it at step 532 by decoding the beginning bookend segment and removing each frame that is after the beginning bookend. At step 534, the system further re-encodes the remaining frames of the segment. Depending on video encoding, steps 532 and 534 may be replaced by a single step where all frames after the beginning bookend are removed.

If a segment contains at least one beginning bookend and at least one ending bookend, steps 522, 524, 532, and 534 may be combined as follows: the segment is decoded, the frames corresponding to the target time ranges to be trimmed are removed, and the resulting new segment(s) are re-encoded.

Figure 6:
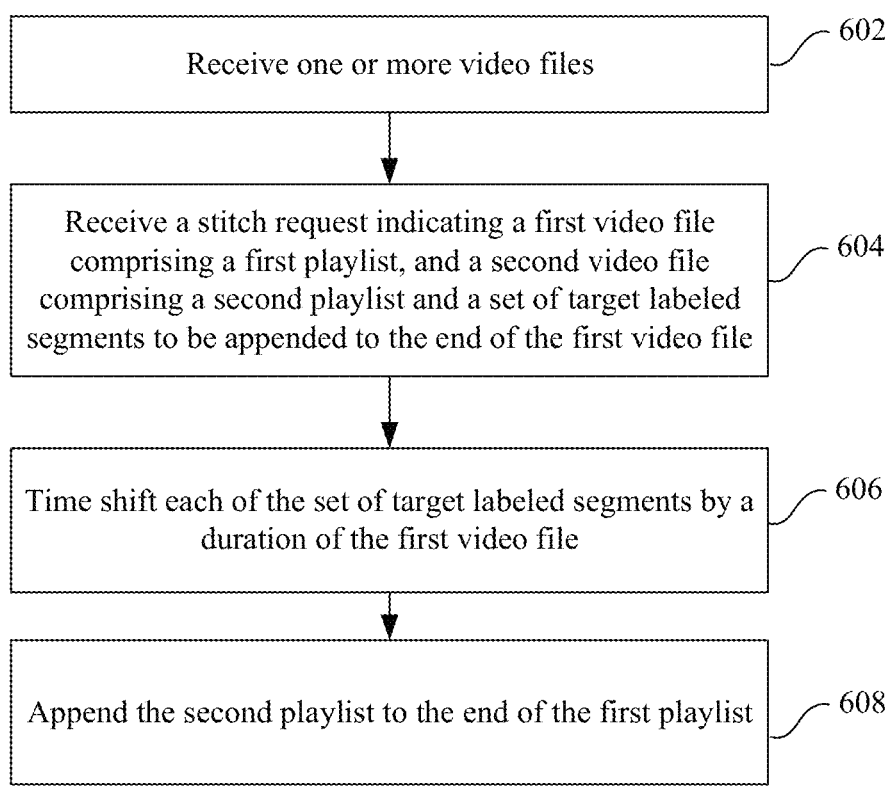
FIG. 6 shows a flowchart that details a process of instant video editing where a stitching request is executed, in accordance with one embodiment of the present invention.

FIG. 6 shows a flowchart that details a process of instant video editing where a stitching request is executed, in accordance with one embodiment of the present invention. At step 602, two or more video files are received by a system to carry out instant video editing. At step 604, a stitch request is received by the system. The received stitch request indicates a first video file comprising a first playlist, and a second video file comprising a second playlist containing a set of target labeled segments to be appended to the end of the first video file. At step 606, the system time shifts each of the set of target labeled segments by a duration of the first video file. Note that time shifting a segment consists in modifying the timestamp of each frame of the segment, as discussed above. At step 608, the system appends the second playlist to the end of the first playlist.

In another embodiment, the set of target video segments to be appended to the end of the first video file, received as part of the stitch request in step 604, may belong to multiple distinct video files and may be listed on multiple distinct playlists. The stitching process requires only that the labels added to the first playlist (in step 606) point to the target segments to be appended to the first video. Furthermore, the stitching process may require the resulting modified first playlist to have distinct labels, thus necessitating an additional segment relabeling step following step 606.

Architecture and Security Considerations

An important aspect to call out about generating bookend segments following the methods described herein, is the security aspect. Even though the result of an edited video can be displayed almost instantly, the security behind exposing video and audio frames that were not meant to be shown to a viewer (i.e., were meant to be left out by the editor) must be addressed. In some embodiments, the viewer downloads the edited video from a server. The deleted frames must, therefore, not be sent to the viewer's device. These frames were edited out for a reason, and they may contain sensitive or damaging information.

This means that bookend segments may need to be processed and stored server-side before users can view an edited video. The editing process will be instant for the creator, but also for the viewer (similar to the speed at which MP4 downloads are generated today through the process described in U.S. Pat. Nos. 10,484,737 and 9,641,566).

The result of the instant editing will also be instant for the viewer because the bookend segments can be generated in real-time. In other words, the modified segments can be generated while they are being downloaded.

Figure 7:
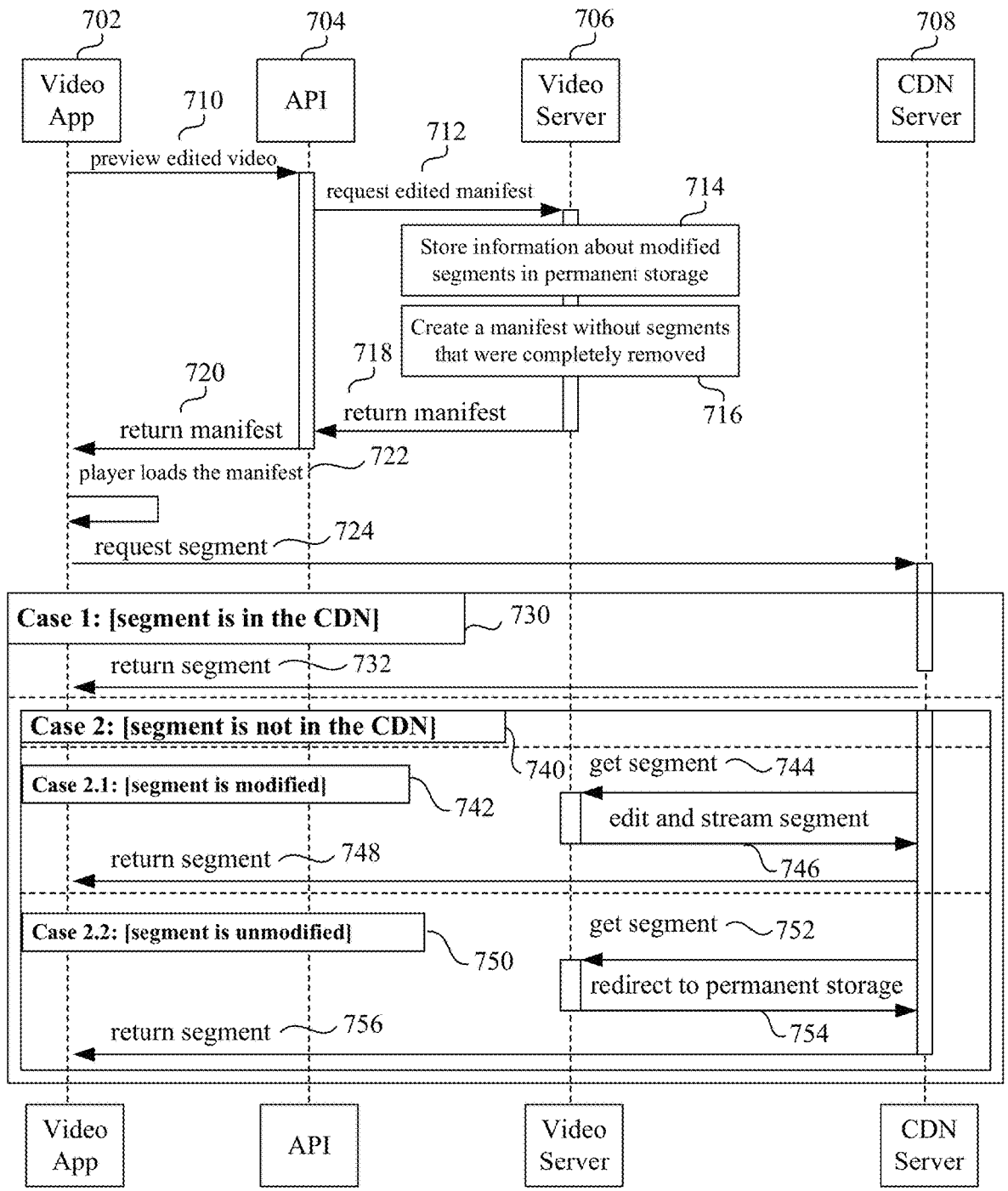
FIG. 7 shows the message and file exchanges required for a secure just-in-time execution of a trim request, according to one embodiment of the present invention.

FIG. 7 shows the message and file exchanges required for a secure just-in-time execution of a trim request, according to one embodiment of the present invention. Those exchanges occur between the video editing application 702, the Application Programming Interface (API) 704, the video server 706, and the Content Distribution Network (CDN) server 708. In FIG. 7, the video application 702 runs from the user device of the video editor, where the trimming instructions are generated, and the video is previewed. In the context of FIG. 7, the video editor is the user generating the trimming instructions, such as the creator or owner of the video. The video editing application 702 also runs from the user devices of the video viewers (e.g., video recipients, members of the viewing public), where the video playback occurs. Note that although all video applications 702 have a player function, the video application operated by the editor may have editing and previewing functionalities that are absent or locked on video application 702 versions run from viewer devices.

The video server 706 is the audio and video (AV) server that handles the re-encoding of video content and the management of video assets over the video distribution network. For example, the video server 706 keeps a copy of the original segments of served video files and streams in its permanent storage. In the context of FIG. 7, "permanent storage" refers to a networked permanent storage resource that is available to the video server 706, and may be implemented using any object storage service such as AMAZON's Simple Storage Service (AMAZON S3). The CDN server 708 is responsible for video segment caching and distribution. The functionalities associated with each of the listed interfaces (702, 704, 706, 708) are described in further detail below.

Once editing instructions (i.e., a trim or a stitch request) are input to the video application 702 by the editor (e.g., using a "publish" or "preview" request), the edits associated with each segment of the video file may be coded in any data interchange format such as a JSON (JavaScript Object Notation) file. The file containing the edits is usually small in size and may be uploaded to the video server's 706 permanent storage. In one embodiment, the editing instructions are added to a video editing database detailing all edits associated with the video file. In one embodiment, the video editing database is located on the video server's permanent storage. The editing instructions identify the edited video through a video identity number or code, and a video revision identity number or code, where different revision identity numbers distinguish different editions (e.g., edited versions) of the same video. Neither the data interchange file, the video editing database, nor the video server's permanent storage are shown in FIG. 7.

FIG. 7 shows an initial preview request 710 sent from the editor's video application to the API 704, where a JSON file is uploaded at the same time as the initial preview 710 request. When the preview 710 request arrives at the API 704, a request for an edited video manifest (i.e., playlist) is emitted 712 to the video server 706, along with the JSON file specifying the video edits.

The video server 706 proceeds to storing 714 information about modified segments from the JSON file on its permanent storage. In addition to video identity and revision identity, this information may include the trimming bookend timestamps. In one embodiment, this information may also include the identity (e.g., label, URI, identity number, code, or name) of the trimmed segments. The video server 706 then generates 716 and returns 718 to the API a new modified manifest containing the segments that were not trimmed out. The modified manifest contains new URIs for the modified segments. The API then relays the modified manifest 720 to the video application 702.

If a video file or stream viewing request (e.g., 710) arrives without an associated JSON file, the video server 706 may proceed to checking whether a JSON file associated with the video exists in its permanent storage. If a JSON file is found, it is used to generate 716 and return a modified manifest (with only present segments) to the application 720 via the API 718. Alternatively, the video server may check its video editing database for the latest edits to the requested video file.

Note that instead of storing 714 information on newly trimmed files in permanent storage and fetching them from permanent storage, the video server 706 may cache that information at an application or client-side cache (e.g., Redis) to save time and bandwidth resources.

Once the video application 702 receives the modified manifest, its video player loads it 722 and starts sending out segment requests 724, where segment requests are requests for the streaming or for the playback of a segment (i.e., segment playback requests). In some embodiments, a segment request is a request for the downloading of a segment to a server or a user device in view of its streaming or playback. In the embodiment of FIG. 7, all segment requests 724 go first to the CDN server. If a segment is already at the CDN server (Case 1) 730, the segment is returned 732 (i.e., streamed or transmitted to the application). This case may correspond to a scenario where a viewer has already requested the segment and it hasn't yet expired from the CDN server's cache. In the trimming case of FIG. 7, if this is a first view or preview 710 request of a trimmed video, then this case corresponds to an unmodified segment that is readily available at the CDN server (i.e., an unmodified, frequently viewed, and still cached segment).

If the segment is not in the CDN server (Case 2) 740, the segment is either modified (Case 2.1) 742 or unmodified (Case 2.2) 750 by the recent trimming operation. In both cases, a request for the segment is sent from the CDN server 708 to the video server 706.

If the segment is modified 742 (i.e., edited), the segment request 744 prompts the video server to edit and stream it 746 back to the CDN server, where editing may involve re-encoding the segment (e.g., regenerating an I-Frame). In the trimming case of FIG. 7, if this is a first view or preview 710 request of a trimmed video, then this case corresponds to a newly trimmed segment that required editing by the video server. Note that the streaming of the segment 746 can start before the editing operations 746 (e.g., re-encoding) are completed. The CDN server, in turn, streams the segment to the application 748.

If the segment is unmodified 750, the segment request 752 prompts the video server to redirect the request to its permanent storage 754. The CDN server can then download the segment from permanent storage and stream it 756 to the application. In the trimming case of FIG. 7, if this is a first view or preview 710 request of a trimmed video, then this case corresponds to an unmodified segment that is not readily available at the CDN server (e.g., an unmodified, rarely viewed, segment that is absent from the cache). Alternatively, the requested segment may never have been served before, or may never have been served from the location of the CDN server.

FIG. 7 shows a scenario where the actual editing operations (i.e., generating 716 the modified manifest and editing 746 the modified segments) are triggered by a "preview" 710 request, and associated segment requests 724, emanating from the device of the editor. In other embodiments, after receiving a trim request from the editor and updating the manifest 716, the video server may immediately receive modified segment requests 744 originating from the video player 722 of a user device other than the editor's device (i.e., from a viewer). The video server may therefore execute the segment-editing operations 746 described herein in response to a segment streaming request 744 initiated through a view request from a viewer device.

In the architecture of FIG. 7, a URI is a reference to a target video segment and includes code for the identity of the video the target segment is part of (i.e., a video name, number, or code), the identity of the target segment (i.e., a segment name, number, or code), the revision identity of the video the target segment is part of (a video revision number or code), and a location of the target segment in storage. The revision identity indicates the video editing version (e.g., an edit count) and is associated with the whole video rather than any of its segments.

Two types of URIs are used in the context of FIG. 7: playlist URIs and raw URIs. Playlist URIs identify segments to be played and point to locations on the video server's permanent storage. These URIs are listed on video playlists and are accessible to video player software in the viewer's device. A raw URI, on the other hand, is a URI that points to a raw video segment associated with an edited video segment, where a raw segment is an unmodified segment comprising all the original frames recorded by the creator of the video. Raw URIs are not used on playlists and are therefore never exposed to viewer devices. A raw URI associated to a given edited segment is accessible to the video server only through an authentication service. Therefore, the playlist URIs contain only video server segment endpoints, rather than raw segment endpoints. Following this precaution prevents viewer software from copying the video signature and attempting to download the raw or transcoded segments, thus providing editors with the peace of mind that the parts that were trimmed from the video would not leak in any way.

In one embodiment, upon receiving a segment request, the video server obtains the segment's starting and ending timestamps based on the segment request. The video server then uses the editing instructions located in the trim request's JSON file or the trim request's video editing database entry to determine whether the requested segment is edited or unmodified. As described in the example of FIG. 2A, the video server can determine whether the requested segment is a beginning bookend segment, an ending bookend segment, or a time shifted segment, by comparing the segment's starting and ending timestamps with the beginning and/or ending bookend timestamps of the latest trim request. The video server then uses the requested segment's URI to obtain the URI of the raw segment associated with requested segment. If the segment is unmodified, the video server sends the corresponding raw segment bytes to the viewer via the CDN server. If the segment is modified (i.e., edited), the video server generates the modified segment and sends it to the viewer via the CDN server.

It is important to note that a segment URI may refer to a segment that is inexistent: Specifically, a first request for a segment that has just been edited is a request for a segment that may not exist yet. In one embodiment, an edited segment's URI contains a new revision number. In FIG. 7, the request for such an edited segment will fall under Case 2 ("segment is not in the CDN"). The segment request will thus be directed to the video server which will proceed to generating the segment and returning it to the CDN server. The CDN server may then cache the edited segment and transmit a copy of it to the viewer.

In one embodiment, the video server may determine that a requested segment no longer exists by extracting its revision identity from its URI and comparing it to the latest revision number (e.g., by consulting the video editing database). The video server may then respond by returning a segment containing zero bytes.

The example architecture of FIG. 7 enables editing operations to be fully managed by the video server 706 and to remain hidden from the CDN server 708, the CDN server thus responding to segments based solely on whether they are located in its cache or not. On the other hand, the example architecture of FIG. 7 preserves video server 706 resources by reducing its activities to cases where editing is required. Even requests 750 for unmodified segments that are absent from the CDN server 708 are merely redirected 756 to permanent storage, decreasing the load on the video server 706. The video server 706 therefore only serves segments that have to re-encoded.

In addition to being simple to implement, the architecture described in FIG. 7 solves major security and efficiency issues by preventing trimmed segments from leaking and decreasing video server loads.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be in direct or indirect communication with, for example, one another over the same or different wired or wireless networks. Additionally, while FIGS. 8 and 9 illustrate the various system entities as separate, standalone entities, the various embodiments are not limited to this particular architecture.

Exemplary Management Computing Entity

Figure 8:
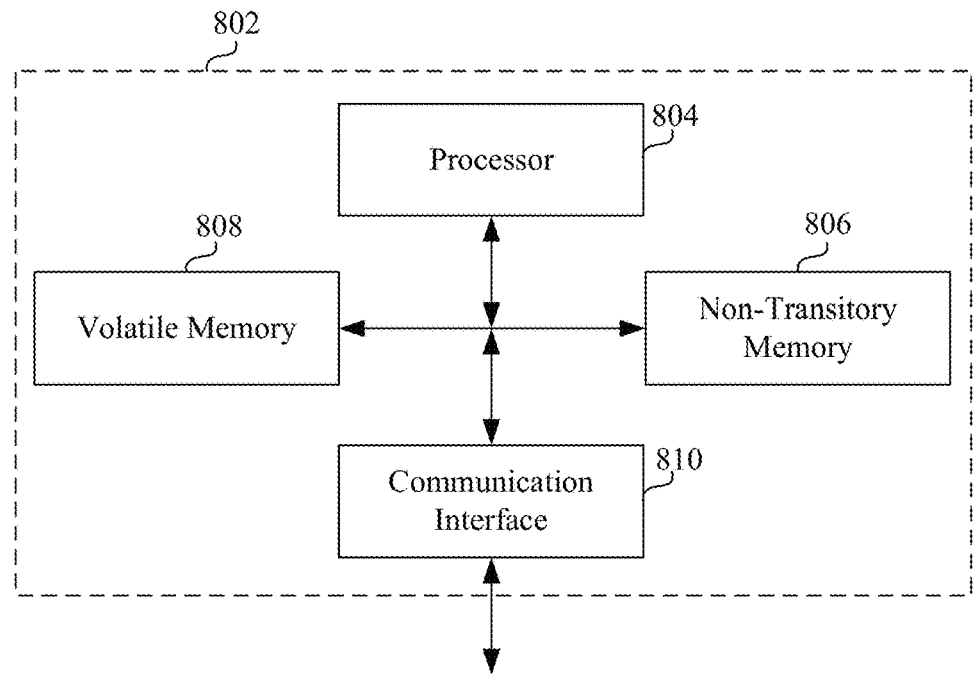
FIG. 8 provides a schematic of a server (management computing entity) for implementing a system of instant video editing, according to one embodiment of the present invention.
Figure 9:
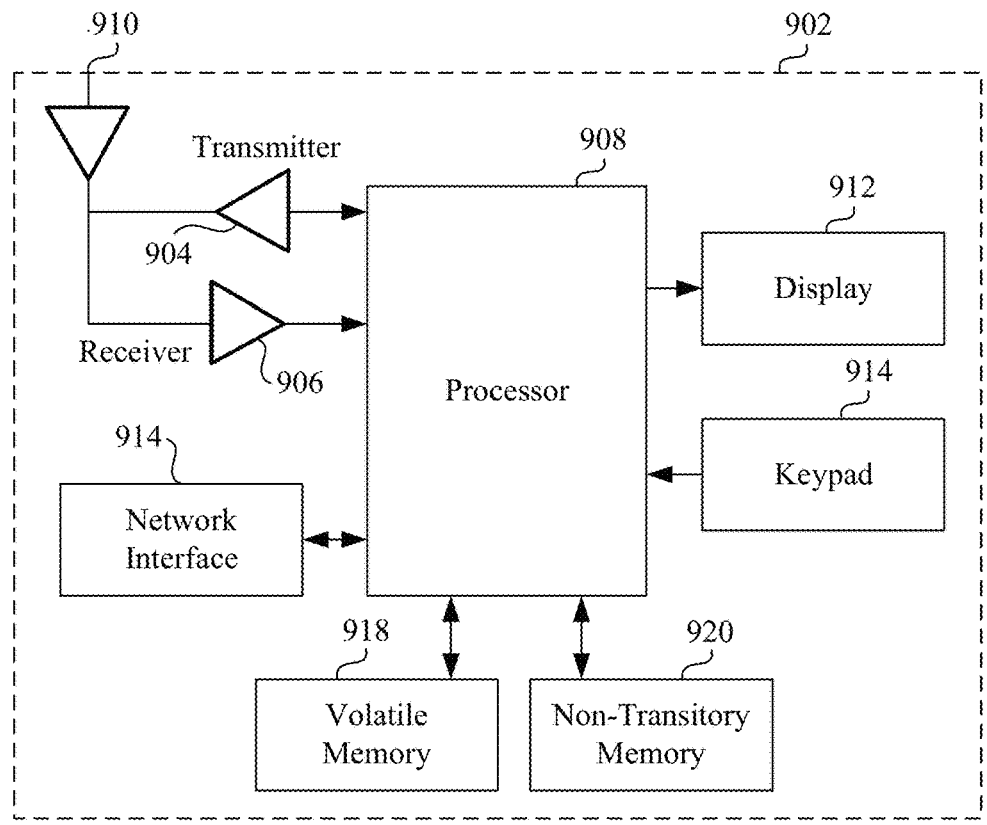
FIG. 9 provides an illustrative schematic representative of a client (user computing entity) for implementing a system of instant video editing that can be used in conjunction with embodiments of the present invention.

FIG. 8 provides a schematic of a server, or "management computing entity," (802) according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity (802) may also include one or more communications interfaces (810) for communicating with various computing entities, such as by communicating data, content, and/or information (similar terms used herein interchangeably) that can be transmitted, received, operated on, processed, displayed, stored, and/or the like.

As shown in FIG. 8, in one embodiment, the management computing entity (802) may include or be in communication with one or more processors (i.e., processing elements) (804) (also referred to as processors and/or processing circuitry—similar terms used herein interchangeably) that communicate with other elements within the management computing entity (802) via a bus, for example. As will be understood, the processor (804) may be embodied in a number of different ways. For example, the processor (804) may be embodied as one or more complex programmable logic devices (CPLDs), microprocessors, multi-core processors, coprocessing entities, application-specific instruction-set processors (ASIPs), microcontrollers, and/or controllers. Further, the processor (804) may be embodied as one or more other processing devices or circuitry. The term circuitry may refer to an entire hardware embodiment or a combination of hardware and computer program products. Thus, the processor (804) may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processor (804) may be configured for a particular use or configured to execute instructions stored in volatile or non-volatile (or non-transitory) media or otherwise accessible to the processor (804). As such, whether configured by hardware or computer program products, or by a combination thereof, the processor (804) may be capable of performing steps or operations according to embodiments of the present disclosure when configured accordingly.

In one embodiment, the management computing entity (802) may further include or be in communication with non-transitory memory (also referred to as non-volatile media, non-volatile storage, non-transitory storage, memory, memory storage, and/or memory circuitry—similar terms used herein interchangeably). In one embodiment, the non-transitory memory or storage may include one or more non-transitory memory or storage media (806), including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity (802) may further include or be in communication with volatile media (also referred to as volatile storage, memory, memory storage, memory and/or circuitry—similar terms used herein interchangeably). In one embodiment, the volatile storage or memory may also include one or more volatile storage or memory media 808, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor (804). Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity (802) with the assistance of the processor (804) and operating system.

As indicated, in one embodiment, the management computing entity (802) may also include one or more communications interfaces (810) for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity (802) may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity (802) may include or be in communication with one or more input elements, such as a keyboard input, a mouse input, a touch screen/display input, motion input, movement input, audio input, pointing device input, joystick input, keypad input, and/or the like. The management computing entity (802) may also include or be in communication with one or more output elements (not shown), such as audio output, video output, screen/display output, motion output, movement output, and/or the like.

As will be appreciated, one or more of the components of the management computing entity (802) may be located remotely from other management computing entity (802) components, such as in a distributed system. Furthermore, one or more of the components may be combined and additional components performing functions described herein may be included in the management computing entity (802). Thus, the management computing entity (802) can be adapted to accommodate a variety of needs and circumstances. As will be recognized, these architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 9 provides an illustrative schematic representative of a client, or "user computing entity," (902) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities (902) can be operated by various parties. As shown in FIG. 9, the user computing entity (902) can include an antenna (910), a transmitter (904) (e.g., radio), a receiver (906) (e.g., radio), and a processor (i.e., processing element) (908) (e.g., CPLDs, microprocessors, multi-core processors, coprocessing entities, ASIPs, microcontrollers, and/or controllers) that provides signals to and receives signals from the transmitter (904) and receiver (906), respectively.

The signals provided to and received from the transmitter (904) and the receiver (906), respectively, may include signaling information in accordance with air interface standards of applicable wireless systems. In this regard, the user computing entity (902) may be capable of operating with one or more air interface standards, communication protocols, modulation types, and access types. More particularly, the user computing entity (902) may operate in accordance with any of a number of wireless communication standards and protocols, such as those described above with regard to the management computing entity (902). In a particular embodiment, the user computing entity (902) may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity (902) may operate in accordance with multiple wired communication standards and protocols, such as those described above with regard to the management computing entity (902) via a network interface (914).

Via these communication standards and protocols, the user computing entity (902) can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity (902) can also download changes, add-ons, and updates, for instance, to its firmware, software (e.g., including executable instructions, applications, program modules), and operating system.

According to one embodiment, the user computing entity (902) may include location determining aspects, devices, modules, functionalities, and/or similar words used herein interchangeably. For example, the user computing entity (902) may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's (902) position in connection with a variety of other systems, including cellular towers, Wi-Fi access points, and/or the like. Similarly, the user computing entity (902) may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or instant video editing to within inches or centimeters.

The user computing entity (902) may also comprise a user interface (that can include a display (912) coupled to a processor (908) and/or a user input interface coupled to a processor (908). For example, the user interface may be a user application, browser, user interface, and/or similar words used herein interchangeably executing on and/or accessible via the user computing entity (902) to interact with and/or cause display of information from the management computing entity (902), as described herein. The user input interface can comprise any of a number of devices or interfaces allowing the user computing entity (902) to receive data, such as a keypad (914) (hard or soft), a touch display, voice/speech or motion interfaces, or other input device. In embodiments including a keypad (914), the keypad (914) can include (or cause display of) the conventional numeric (0-9) and related keys (#, *), and other keys used for operating the user computing entity (902) and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity (902) can also include volatile storage or memory (918) and/or non-transitory storage or memory (920), which can be embedded and/or may be removable. For example, the non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory can store databases, database instances, database management systems, data, applications, programs, program modules, scripts, source code, object code, byte code, compiled code, interpreted code, machine code, executable instructions, and/or the like to implement the functions of the user computing entity (902). As indicated, this may include a user application that is resident on the entity or accessible through a browser or other user interface for communicating with the management computing entity (902) and/or various other computing entities.

In another embodiment, the user computing entity (902) may include one or more components or functionality that are the same or similar to those of the management computing entity (902), as described in greater detail above. As will be recognized, these architectures and descriptions are provided for exemplary purposes only and are not limiting to the various embodiments.

Exemplary Client Server Environment

Figure 10:
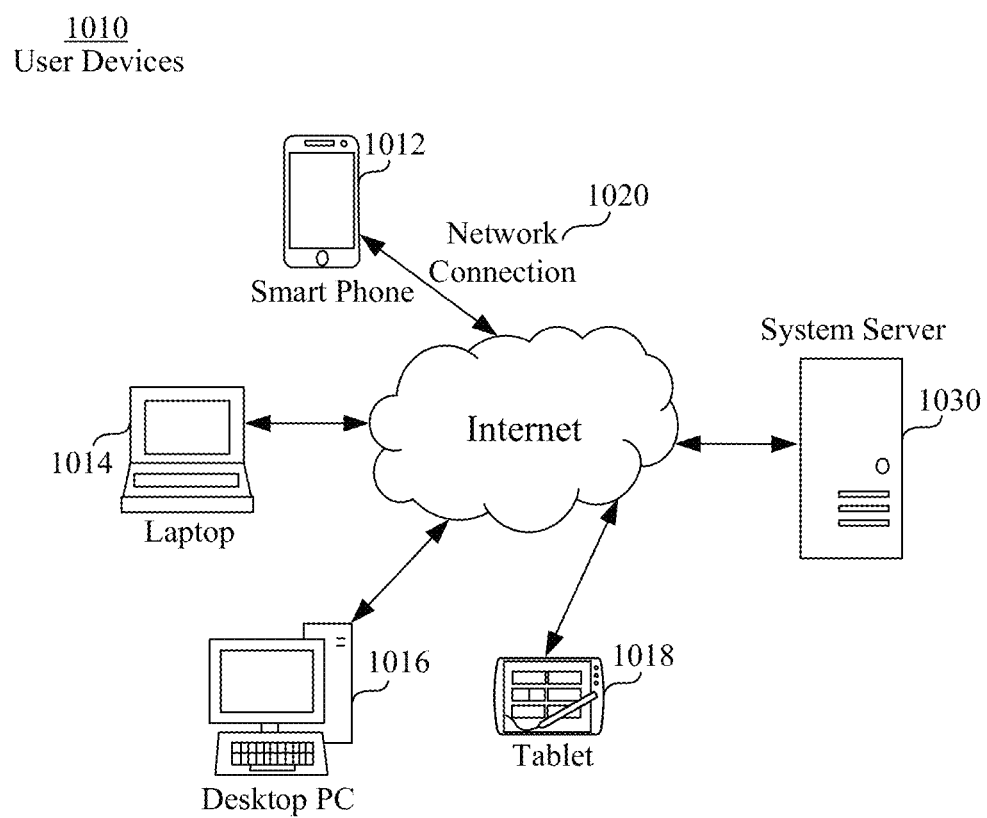
FIG. 10 shows an illustrative system architecture diagram for implementing one embodiment of instant video editing in a client-server environment.

The present invention may be implemented in a client server environment. FIG. 10 shows an illustrative system architecture for implementing one embodiment of the present invention in a client server environment. User devices (i.e., image-capturing device) (1010) on the client side may include smart phones (1012), laptops (1014), desktop PCs (1016), tablets (1018), or other devices. Such user devices (1010) access the service of the system server (1030) through some network connection (1020), such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer having a graphical user interface or a web browser through which a user can interact with an implementation of the subject matter described herein, or any combination of one or more such back end, middleware, or front end components. The components of the system can be interconnected by any form or medium of digital information/ data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module, or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every use case and application is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment.

What is claimed is:

1. A computer-implemented method for video editing, the computer-implemented method executable by a hardware processor, the method comprising:
    receiving a video file, the video file comprising a plurality of labeled video segments and a playlist, the playlist comprising a plurality of segment labels providing an order for playing the labeled video segments, wherein each labeled video segment comprises a plurality of frames and a corresponding plurality of timestamps;
    receiving a trim request, the trim request comprising a target time range to be removed from the video file, wherein the target time range starts at a beginning bookend timestamp and ends at an ending bookend timestamp;
    identifying a beginning bookend segment and an ending bookend segment from the plurality of labeled video segments based on the beginning bookend timestamp and the ending bookend timestamp;
    processing, just-in-time, one of the beginning bookend segment and the ending bookend segment based on the target time range to be removed, wherein processing the beginning bookend segment comprises removing each frame of the beginning bookend segment that is after the beginning bookend timestamp to generate a modified beginning bookend segment, and wherein processing the ending bookend segment comprises decoding the ending bookend segment, removing each frame of the ending bookend segment that is before the ending bookend timestamp, and re-encoding one or more frames of the ending bookend segment that are after the ending bookend timestamp to generate a modified ending bookend segment;
    identifying one or more given labeled video segments to be deleted from the playlist based on the beginning bookend timestamp and the ending bookend timestamp;
    removing deleted segment labels from the playlist corresponding to the given labeled video segments to be deleted; and
    generating an edited video file by generating a modified playlist, the edited video file comprising the modified playlist and one of the modified beginning bookend segment and the modified ending bookend segment.

2. The computer-implemented method of claim 1, wherein the ending bookend timestamp is at an end of one of the plurality of labeled video segments.

3. The computer-implemented method of claim 1, wherein the beginning bookend timestamp is at a beginning of one of the plurality of labeled video segments.

4. The computer-implemented method of claim 1, further comprising:
   transmitting one of the modified beginning bookend segment and modified the ending bookend segment to a device for playback.

5. The computer-implemented method of claim 1, further comprising:
   identify a given segment shifted in time by the trim request as a time-shifted segment; and
   processing the time-shifted segment by shifting a plurality of timestamps corresponding to a plurality of frames of the time-shifted segment by the duration of the target time range.

6. The computer-implemented method of claim 1, wherein a given labeled video segment to be deleted starts after the beginning bookend timestamp and ends before the ending bookend timestamp.

7. The computer-implemented method of claim 1, further comprising:
   storing the modified playlist of the edited video file on a server, and
   transmitting the modified playlist to a device for playback.

8. The computer-implemented method of claim 1, wherein the trim request is coded in a data interchange format.

9. The computer-implemented method of claim 1, wherein the trim request is a JavaScript Object Notation (JSON) file.

10. The computer-implemented method of claim 1, further comprising:
    storing the trim request in a video editing database.

11. The computer-implemented method of claim 1, further comprising:
    storing the trim request at a client-side cache.

12. The computer-implemented method of claim 1, further comprising:
    receiving a segment request from a device for playback before the processing of the one of the beginning bookend segment and the ending bookend segment; and
    processing, just-in-time, the one of the beginning bookend segment and the ending bookend segment, in response to the receiving of the segment request from the device for playback.

13. The computer-implemented method of claim 12, wherein the segment request comprises a request for one of the plurality of labeled video segments of the video file.

14. The computer-implemented method of claim 12, wherein the segment request comprises a request for one of the modified beginning bookend segment and the modified ending bookend segment.

15. The computer-implemented method of claim 1, wherein the trim request is received from a mobile device.

16. A non-transitory storage medium storing program code for video editing, the program code executable by a hardware processor, the program code when executed by the hardware processor causing the hardware processor to:
    receive a video file, the video file comprising a plurality of labeled video segments and a playlist, the playlist comprising a plurality of segment labels providing an order for playing the labeled video segments, wherein each labeled video segment comprises a plurality of frames and a corresponding plurality of timestamps;
    receive a trim request, the trim request comprising a target time range to be removed from the video file, wherein the target time range starts at a beginning bookend timestamp and ends at an ending bookend timestamp;
    identify a beginning bookend segment and an ending bookend segment from the plurality of labeled video segments based on the beginning bookend timestamp and the ending bookend timestamp;
    process, just-in-time, one of the beginning bookend segment and the ending bookend segment, wherein the program code to process the beginning bookend segment comprises program code to remove each frame of the beginning bookend segment that is after the beginning bookend timestamp, and wherein the program code to process the ending bookend segment comprises program code to decode the ending bookend segment, remove each frame of the ending bookend segment that is before the ending bookend timestamp, and re-encode each frame of the ending bookend segment that is after the ending bookend timestamp; and
    generate an edited video file, the edited video file comprising one of the modified beginning bookend segment and the modified ending bookend segment.

17. The non-transitory storage medium of claim 16, further comprising program code to:
    receive a segment request from a device for playback before the processing of the one of the beginning bookend segment and the ending bookend segment; and
    process, just-in-time, the one of the beginning bookend segment and the ending bookend segment, in response to the receiving of the segment request from a device for playback.

18. The non-transitory storage medium of claim 16, wherein the segment request comprises a request for one of the plurality of labeled video segments of the video file.

19. The non-transitory storage medium of claim 16, wherein the segment request comprises a request for one of the modified beginning bookend segment and the modified ending bookend segment.

20. The non-transitory storage medium of claim 16, further comprising program code to:
    identify a given labeled video segment to be deleted from the playlist based on the beginning bookend timestamp and the ending bookend timestamp, and
    remove a given segment label from the playlist corresponding to the given labeled video segment to be deleted.

* * * * *